United States Patent [19]
Nemec

[11] 3,784,181
[45] Jan. 8, 1974

[54] ENERGY ABSORBING BUCKLING BOX
[75] Inventor: John E. Nemec, Tallmadge, Ohio
[73] Assignee: The General Tire & Rubber Company, Akron, Ohio
[22] Filed: May 5, 1972
[21] Appl. No.: 250,765

[52] U.S. Cl. ............................................. 267/140
[51] Int. Cl. ............................................ F16f 7/12
[58] Field of Search................... 267/139, 140, 141, 267/116

[56] References Cited
UNITED STATES PATENTS
| | | | |
|---|---|---|---|
| 3,600,896 | 8/1971 | Tateisi et al. | 267/140 |
| 3,563,525 | 2/1971 | Narabu | 267/140 |
| 3,708,988 | 1/1973 | Miura | 267/140 |
| 3,507,123 | 4/1970 | Miura | 267/140 |
| 3,680,851 | 8/1972 | Takada | 267/140 |
| 3,418,816 | 12/1968 | Kumazawa | 267/116 |

*Primary Examiner*—James B. Marbert

[57] ABSTRACT

An energy absorbing buckling box having a tubular polygonal elastomeric member. The energy absorber preferably includes a pair of telescoping tubular polygonal members, each of which include a restraining means between which means is positioned at least one elastomeric member to control the relative telescoping of the members and absorb energy by buckling.

12 Claims, 12 Drawing Figures

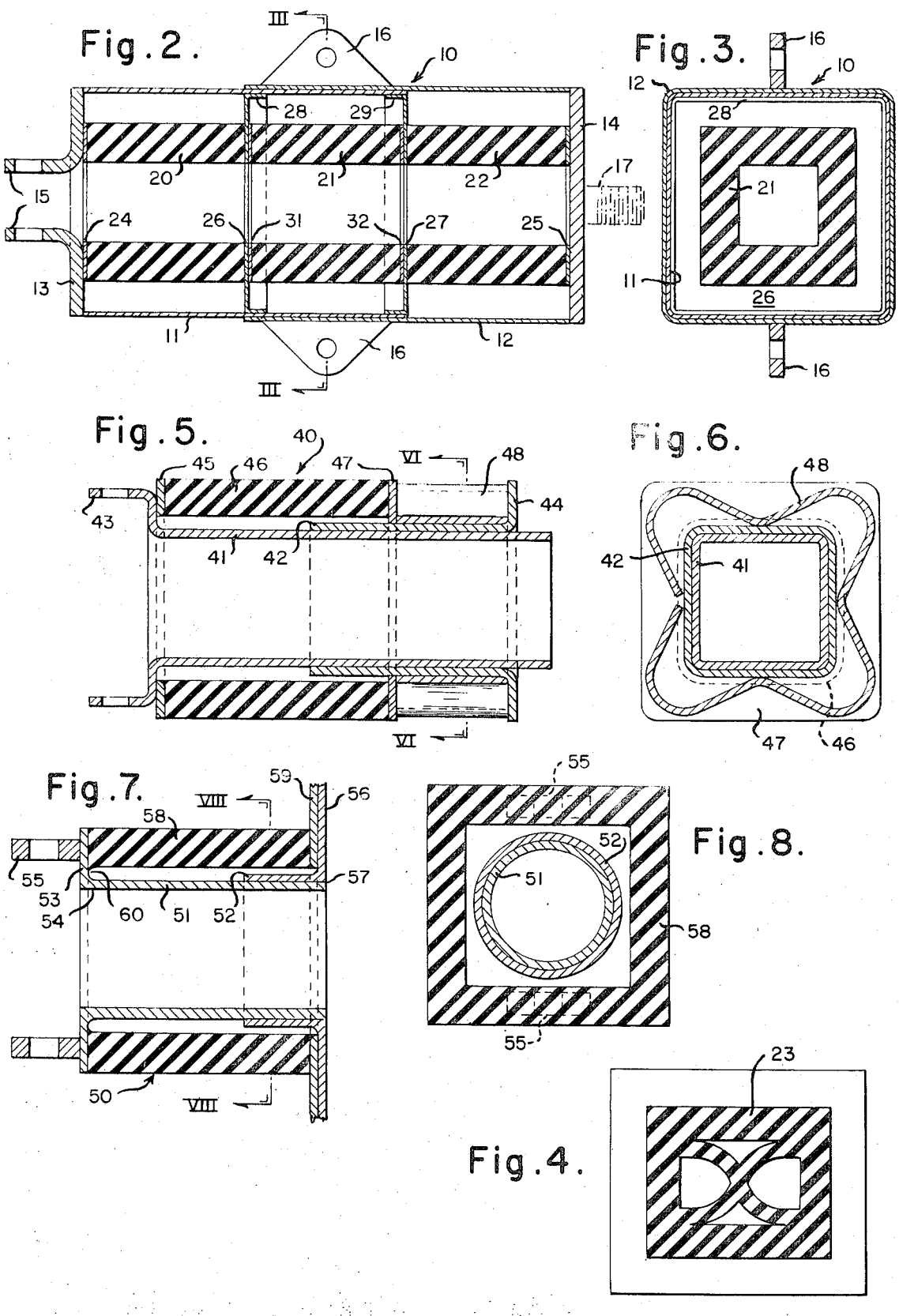

3,784,181

ENERGY ABSORBING BUCKLING BOX

FIELD OF THE INVENTION

The present invention relates to an energy absorbing impact assembly and, in particular, to a self-restoring energy absorbing buckling box assembly.

BACKGROUND OF THE INVENTION

Energy absorbing impact devices have been known and used for many years. While many of these devices are utilized in a broad range of application, they have not found practical utility in automobiles. Recent attention has been focused upon protecting the automobile from physical damage which results from vehicular collision. Thus, it is proposed that automobiles be free from damage which might otherwise occur when a vehicle collides with an object at a predetermined speed and particularly at low speed, e.g. 5 mph.

Many proposals and attempts have been made to meet this safety objective and, in particular, to provide high energy absorption in an inexpensive device of relatively small size. One approach commonly used has been to provide a device which is axially deformable, such as either a pneumatically or hydraulically cushioned telescoping assembly or an assembly which utilizes the plastic property of the material from which it is constructed to absorb or dissipate the impact energy. For example, see U.S. Pat. Nos. 1,655,777; 2,870,871; 3,203,723; 3,268,256; 3,307,868; 3,373,630; 3,412,628; 3,428,150; 3,508,633; and 3,511,345.

In the case of a hydraulic or pneumatic energy absorber, the impact energy is absorbed by the controlled leakage of oil or air contained within a cylinder upon compression of a piston within the cylinder or the cylinder itself. While this type of device is effective, it is structurally complex and the resistance depends upon compression speed which provides difficulties in obtaining constant force at varying speeds.

In assemblies which rely upon plastic deformation of their construction material, the structure deforms axially by means of corrugating a cylindrical member wherein the energy is absorbed by compression of the corrugated sections beyond their elastic limit. Plastic deformation of non-corrugated cylindrical members is also utilized wherein the cylindrical member is axially deformed in accordian-like fashion or by stepping the cylinder so that deformation by compressive forces causes the cylinder to fold back to form an intermediate tube. Substantial amounts of impact energy can be absorbed by these means without the undesirable recoil associated with spring type energy absorbers. However, once the device has been deformed beyond its limits of elasticity or plastic deformation occurs, the device is not reusable.

The present invention overcomes these disadvantages and provides an energy absorbing device which absorbs high impact loadings, returns to its original configuration without objectionable recoil, and is of a relatively small size.

SUMMARY OF THE INVENTION

The present invention provides an energy absorbing assembly by which impact or shock energy is absorbed by means of a partially constrained or unconstrained elastomeric column. The assembly is self-restoring, but does not have objectionable recoil. The elastomeric columns may be provided either in parallel or in series depending upon the amount of energy to be absorbed as well as the size limitations placed upon the specific embodiment. The present invention provides a means for optimizing the amount of energy absorbed per unit cost and per unit load.

Preferably, the invention provides at least two tubular members coaxially aligned and adapted for telescoping movement with respect to each other. While tubular members are preferred to stabilize against eccentric loadings, the assembly may comprise in some applications an unconstrained rectangular tubular elastomeric column. As preferred, the tubular members are of a square cross-section, but may be of any other desired configuration such as rectangular or polygonal. Also, the tubular members may be of a box type construction wherein the open end of one box is positioned over that of the other or a pair of coaxially aligned rectangular shafts. The members are positioned for a low static frictional engagement therebetween.

A tubular elastomeric member is coaxially positioned, either internally or externally, of the rigid tubular members. The elastomeric members of the present invention absorb the impact energy by buckling in response to the relative movement of the tubular members caused by the impact loading thereon. High energy absorption is achieved by the additional energy absorbed in the corners of the elastomeric members. The corner effect or moment of inertia of the square or rectangular elastomeric member increases the buckling loads for a given cross-sectional load area. Although the elastomeric member may be of any polygonal shape, it is preferably of a square cross-section where the ratio of cross-section to length approaches unity to optimize the efficiency and where the length to wall thickness ratio is from 5 to 6:1 to obtain the greatest energy per pound (of elastomer). The elastomeric member may be a dense cast or injection molded urethane or curable rubber having a SHORE A hardness of at least 50, and, preferably, at least 70.

The advantages of the present invention will become apparent from a perusal of the following drawings taken in connection with a detailed description of presently preferred embodiments.

BRIEF DESCRIPTION OF THE DRAWINGS

FIG. 2 is a sectional elevation of an alternative buckling box in which a pair of structural tubular members has three elastomeric members serially positioned therein;

FIG. 3 is a section taken along line III—III of FIG. 2;

FIG. 4 is a cross-section of an alternative elastomeric member adaptable to the buckling box shown in FIG. 2;

FIG. 5 is a partial section of another buckling box utilizing a single elastomeric member;

FIG. 6 is a section taken along line VI—VI of FIG. 5;

FIG. 7 is a sectional elevation of a further buckling box of the present invention utilizing a single elastomeric member;

FIG. 8 is a section taken along line VIII—VIII of FIG. 7;

DESCRIPTION OF PRESENTLY PREFERRED EMBODIMENTS

Figure 1:
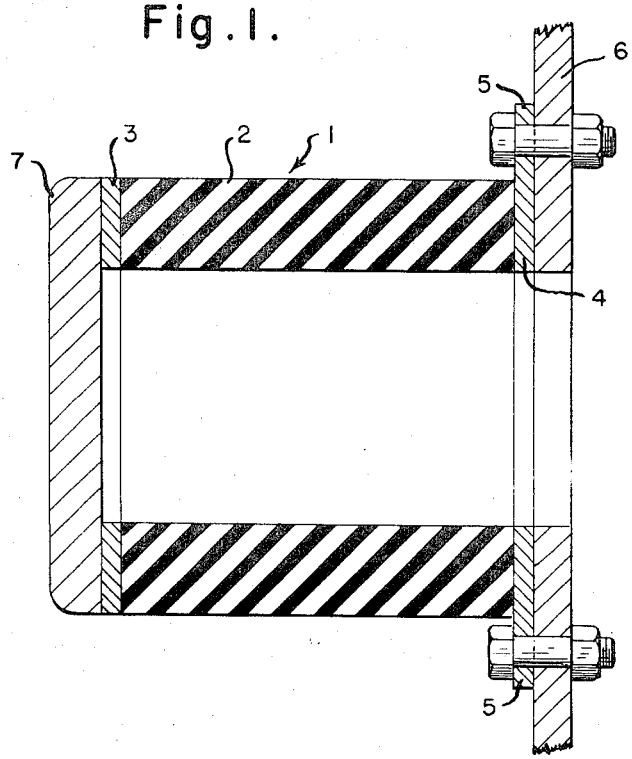
FIG. 1 is a sectional elevation of an elastomeric buckling box.

Referring to FIG. 1, an impact energy absorber assembly 1 is shown comprising an elastomeric member 2 having a pair of end plates 3 and 4 either bonded or integrally formed therein. End plate 4 may include flange 5 for mounting absorber 1 to frame 6 or the like, and end plate 3 may be adapted for bonded mounting to an impact member 7.

Elastomeric member 2 is of either a rectangular or square cross-section in which the ratio of the cross-sectional area to length preferably approaches unity and the ratio of length to wall thickness is about 4 to about 10:1, preferably about 5 to 6:1. Elastomeric member 2 is thus of optimized efficiency and absorbs the greatest amount of energy per pound of elastomer. While efficiency is maximized, as well as energy per pound by utilizing the above ratios, it is clear that those optimizations may not be usable where axial loadings are not necessarily the only forces to which the absorber is subjected. If eccentric loadings are to be experienced, then elastomeric member 2 necessarily have to be dimensioned such as to effect a decrease in the overall axial efficiency of absorber 1, for example, by increasing the cross-sectional area and decreasing the length.

Since in automotive applications, eccentric loadings are a significant consideration, it is preferable to maintain the efficiency of the elastomeric member and to provide alternative stabilization of the absorber assembly. Preferably, this is done by utilization of at least a pair of telescoping rigid tubular members. The elastomeric member may be positioned either externally or internally of the tubular members and is designed to experience buckling upon relative movement of the tubular members. Embodiments of the present invention utilizing tubular members are disclosed in FIGS. 2, 5 and 7. By utilizing elastomers in parallel increased loadings can be achieved without effecting the deflection or buckling of the absorber. Conversely, increased deflection can be achieved by positioning the elastomeric members in series without increasing the load area.

Referring to FIG. 2, an energy absorber of the present invention comprises a pair of rigid tubular structural member 11 and 12. Tubular member 11 is coaxially aligned with and adapted to telescope into tubular member 12. Preferably, the telescoping fitting of members 11 and 12 provide a low static frictional engagement which may in part absorb some of the impact energy. The telescoping overlap of members 11 and 12 in their unloaded or relaxed state is approximately one to one and one-half times the width of the tubular members. Each tubular member 11 and 12 includes an end plate 13 and 14, respectively, which are rigidly mounted or unitized therewith. End plate 13, for example, includes a clevis mounting means 15 which is adapted to mount to an impact member such as a bumper. Tubular member 12 includes a pair of oppositely located mounting brackets 16 for attaching absorber 10 to the unit to be protected, such as to the frame of an automobile. Alternatively, absorber 10 may be attached by means of a threaded stud 17 axially mounted on plate 14.

Elastomeric members 20, 21 and 22 are coaxially aligned within absorber 10. Each elastomeric member is preferably of the same size and shape to maintain a constant buckling force while increasing the allowable deflection by a factor of the number of elastomeric members (in this case by a factor of 3). This embodiment is particularly well suited to applications having space limitations. To increase the buckling load without increasing the cross-sectional area, the length of the elastomeric member is decreased. However, decreasing the length also decreases the allowable deflection, thus requiring additional units. The elastomeric members may be of a vulcanizable rubber or preferably of dense cast or injection molded urethane having a SHORE A hardness of at least 50 and preferably greater than 70. As shown, the elastomeric members are cast in tubular configuration having a square cross-section. Alternatively, the elastomeric member 23, of FIG. 4, may be utilized wherein a "wavy $x$" cross-section is provided. In this embodiment, the "$x$" configuration permits increased axial energy absorption because of the increase load area.

Elastomeric members 20 and 22 each have bonded thereto, either during molding or by post bonding, a securing plate 24 and 25, respectively. Securing plates 24 and 25 preferably have the same configuration and cross-sectional area as the associated elastomeric member and are utilized to facilitate assembly of the elastomeric members in absorber 10. However, it is clear that the plates may be of any configuration depending upon the intended application. Securing plates 24 and 25 are juxtaposed and preferably secured to end plates 13 and 14, respectively. Elastomeric members 20 and 22 have bonded to their inner end flanged spacers 26 and 27 which include perimeter flanges 28 and 29 respectively. Spacer members 26 and 27 are preferably of the same cross-sectional size and configuration as the inner tubular member 11 and are adapted for a low static frictional loading.

Elastomeric member 21 is preferably the same in size, configuration, and material as elastomeric members 20 and 22 as shown. Elastomeric member 21 includes a pair of securing plates 31 and 32 bonded to its ends and having the same cross-sectional shape and size as that of elastomer 21. Securing plates 31 and 32 are preferably secured in a suitable manner to flanged spacers 26 and 27 respectively. Preferably, elastomeric members 20, 21 and 22 are bonded or otherwise secured to their associated securing plates and flanged spacers prior to insertion within tubular member 11. The coaxially aligned assembly of elastomeric members is then coaxially inserted into tubular member 11 and securing plate 24 is bonded to end plate 13.

Figure 9:
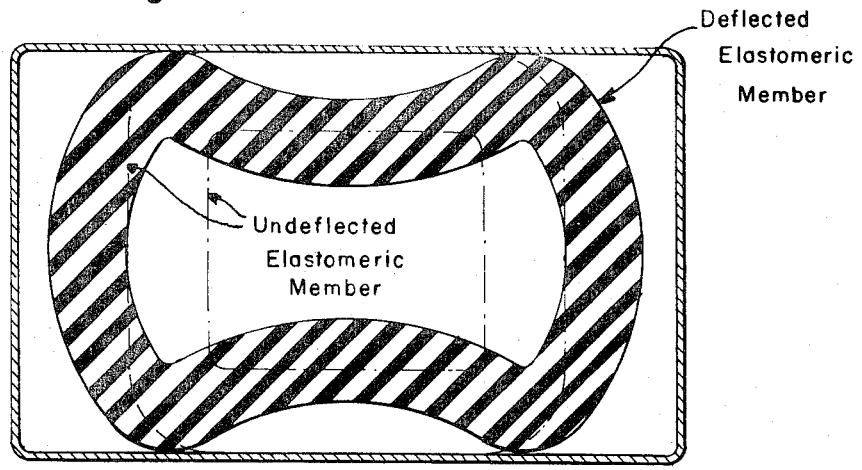
FIG. 9 is a cross-sectional elevation of still a further buckling box in which an elastomeric member is undergoing deflection in which two of its sides are restrained.

As shown, elastomeric members 20, 21 and 22 are of the same size and configuration and coaxially aligned within tubular members 11 and 12. The elastomeric members have cross-sections less than that of the tubular members so that dynamic deflection is unrestricted. Upon an impact force applied to the clevis mountings 15, elastomeric members 20, 21 and 22 are subjected to the same axial loadings and rigid member 11 telescopes into rigid member 12. Elastomeric members 20, 21 and 22 could also be made so that two of their parallel sides are restricted by the members 11 and 12 to force the two sides to buckle inwardly and the two unrestricted sides outwardly; thus obtaining greater buckling loads and increased energy absorption. FIG. 9 diagrammatically shows the nature of the buckling where two of the sides are restricted, and the increased energy is shown graphically in FIG. 12.

Referring to FIG. 5, an absorber 40 represents another embodiment of the invention in which only one elastomeric member is utilized. Absorber 40 includes rigid tubular members 41 and 42. Tubular member 41 is adapted to telescope within member 42 and includes a pair of flared clevis mounts 43 opposing each other formed at the non-telescoped end thereof. Member 42 includes an outwardly extending peripheral flange which is adapted for connection with the body to be protected by any suitable means. A rectangular abutment plate 45 is juxtaposed against the inner surface of the flare clevis mount 43 and assembled by sliding said plate over tubular member 41 in the first instance. An elastomeric member 46 is thereafter positioned over member 41 to abut plate 45. Alternatively, plate 45 could be bonded to elastomeric member 46 to retain coaxial alignment of the assembly. An intermediate abutment plate 47 similar in configuration to plate 45 is thereafter juxtapositioned against elastomeric member 46. Tubular member 42 is then telescoped over member 41 and through plate 47. Between flange 44 of member 42 and intermediate plate 47 is positioned a tubular spacer member 48 which spaces the elastomeric member relative to flange 44 as well as provides a slight axial force. Tubular member 41 may include a number of punched tabs, outwardly extending and abutting flange 44 to retain the assembled unit in its relaxed state.

Another embodiment of the present invention wherein a single elastomeric member is utilized is disclosed in FIG. 7. Energy absorber 50 comprises a pair of tubular members 51 and 52. In this embodiment tubular members 51 and 52 have circular cross-sections and member 51 is adapted to telescope within member 52. Tubular member 51 includes an end plate 53 having a rectangular cross-section and a circular opening 54 therein which conforms in diameter to the inner diameter of member 51. A pair of opposing clevis mounts 55 are rigidly secured to the outer surface of end plate 53 for mounting absorber 50 to an impact contacting member such as a bumper. Tubular member 52 includes an outwardly extending flange 56 having a rectilinear cross-section and circular opening 57 therein which conforms in diameter to the inner diameter member 52. Flange portion 56 is adapted for mounting with a body to be protected from impact such as an automobile.

An elastomeric member 58 having a cross-section conforming in shape to end plate 53 and length substantially the same as absorber 50 is coaxially aligned with and spaced apart from tubular member 51. A square abutment plate 59 is bonded to one end of elastomeric member 58 and adapted to either abut or be bonded to flange 56. Elastomeric member 58 may include an inwardly depending arcuate flange portion 60 at its opposite end. The elastomeric member 58 is first inserted over tubular member 51 and bonded thereto at end plate 53 with an epoxy bonding compound. Additional bonding between flange 60 and tubular member 51 may also be utilized. After insertion of elastomeric member 58 with abutment member 59 bonded thereon, tubular member 52 is telescoped over tubular member 51. Preferably, a low static frictional engagement is achieved between tubular members 51 and 52.

Flange 56 and abutment member 59 may be fastened or bonded together by suitable means to prevent the disassembly of absorber 50.

Figure 10:
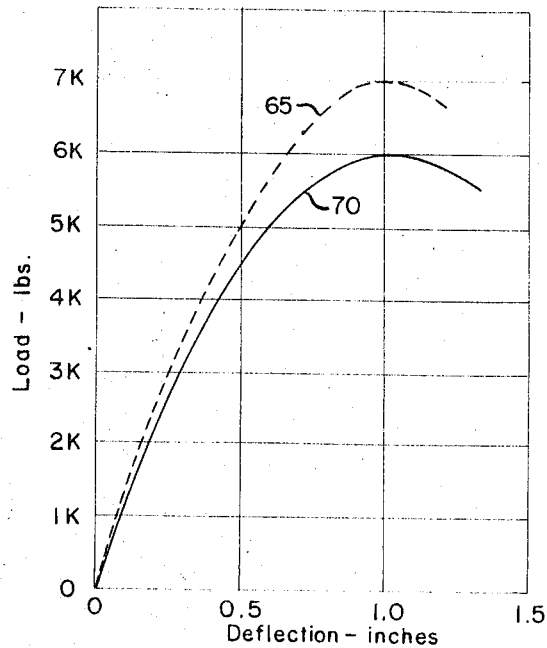
FIGS. 10–12 are deflection curves of various buckling boxes of the present invention.
Figure 11:
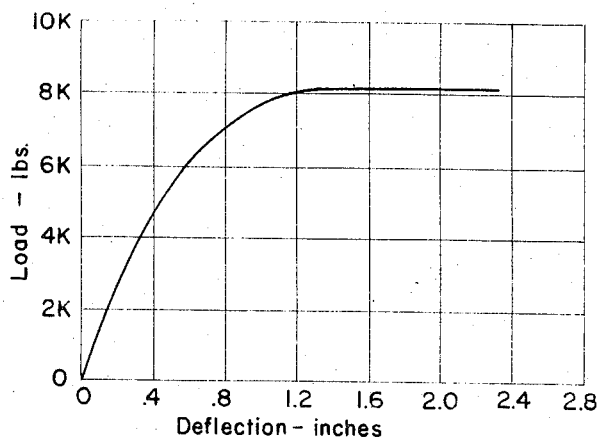
Figure 12:
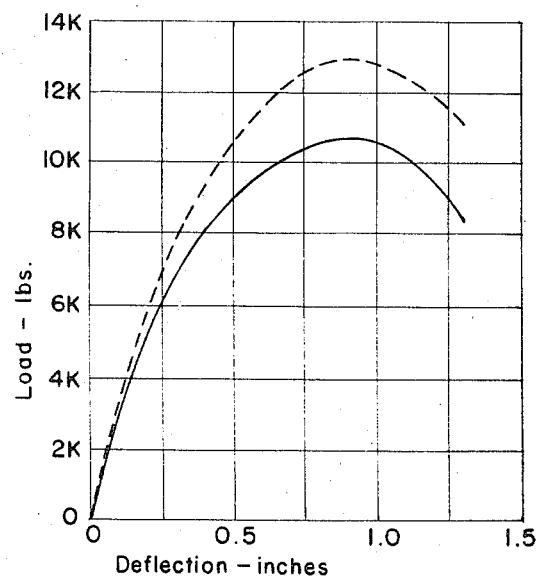

FIGS. 10–12 are deflection curves of various energy absorbers of the present invention. These units were designed to absorb the energy of a 5 mph. impact. Referring to FIG. 10, curve 65 is for an elastomeric member utilizing a wavy $x$, elastomer 23 of FIG. 4. This design is for a load increase without increasing the absorber size. As the absorber unit deflects and the elastomer buckles under a constant peak load, the wavy $x$ section of 23 tends to straighten out. Curve 70 is for a "wavy $x$" elastomeric member having a constant thickness; for example, instead of square corners as shown in FIG. 4, the external corners would have a large radii. The test conditions from which curves 65 and 70 were obtained were a 550 lb. load at 5 mph. The area under the curves represents 5700 in.-lbs. of energy absorbed. The efficiency is 67 percent for the absorber of curve 65 as shown in FIG. 4 and 70.7 percent for the constant thickness absorber of curve 70. Efficiency is defined as the area under the curve divided by the products of peak load and maximum deflection and multiplied by 100.

FIG. 11 represents a graph, load versus deflection, for absorber unit 40 of FIG. 5. The test condition was 1000 lbs. at 6.1 mph. The energy under the curve is 15,300 in.-lbs. The efficiency is 78 percent.

FIG. 12 represents an energy absorber in which two of the sides of the elastomeric member were externally restricted on two sides (dashed curve) and unrestricted (solid curve). The external restriction forces the buckling or bulging inwardly on the restricted sides and outwardly on the unrestricted or free sides. Test condition was 1000 lbs. at 5 mph. The results show a terminal load increase and energy increase of 20 to 25 percent by restricting two of the sides of the elastomeric member.

While presently preferred embodiments of the invention have been shown and described in particularity, the invention may be otherwise embodied within the scope of the present claims.

What is claimed is:

1. An energy absorber comprising first and second rigid tubular members, said first member having an outer cross-sectional configuration and size substantially conforming to the inner cross-sectional configuration and size of the second member, said first member having a portion of its length coaxially positioned within at least a portion of said second member, said first and second members each having associated therewith a restraining means, said restraining means being spaced apart from each other, and at least one coaxially aligned tubular elastomeric member of polygonal cross-section positioned between said restraining means to control relative telescoping movement of the first and second tubular members and absorb energy by outwardly buckling.

2. An energy absorber as set forth in claim 1 wherein the elastomeric member is of rectangular cross-section.

3. An energy absorber as set forth in claim 1 wherein the ratio of the cross-sectional area to length is approximately equal to one and the ratio of the wall thickness is from about 5 to 6:1.

4. An energy absorber as set forth in claim 3 wherein the elastomeric member is selected from the group consisting of curable rubbers and cast and moldable urethanes having a SHORE A hardness of at least 50.

5. An energy absorber as set forth in claim 4 wherein the elastomeric member has a SHORE A hardness of at least 70.

6. An energy absorber as set forth in claim 1 wherein said elastomeric member has a cross-sectional size different from said first and second members.

7. An energy absorber as set forth in claim 1 wherein said elastomeric member has a cross-sectional configuration conforming to at least one of said first and second tubular members.

8. An energy absorber as set forth in claim 1 wherein said restraining means extend outwardly of their associated member and said elastomeric member is positioned coaxially and externally of at least one of said tubular members.

9. An energy absorber as set forth in claim 1 wherein said restraining means extend inwardly of their associated member and said elastomeric member is positioned coaxially and internally of at least one of said tubular members.

10. An energy absorber as set forth in claim 1 wherein at least one coaxial element cross-sectionally related to one of said restraining means is interposed between and spaced apart from said restraining means, said elastomeric member being coaxially positioned with respect to said tubular members and between one of said restraining means and coaxial element, and a spacer member positioned between said coaxial element and said other restraining means.

11. An energy absorber as set forth in claim 1 wherein at least one coaxial element cross-sectionally related to one of said restraining means is interposed between and spaced apart from said restraining means, and wherein at least a pair of elastomeric members are coaxially positioned with respect to said tubular members and between at least one of said restraining means and element, and element and element.

12. An energy absorber as set forth in claim 1 wherein two parallel sides of the elastomeric member are restricted whereby the elastomeric member absorbs energy by buckling outwardly on the unrestricted sides and inwardly on the restricted sides.

* * * * *